Nov. 26, 1946.  W. H. RUPP ET AL  2,411,809
APPARATUS FOR SEPARATING FLUIDS
Original Filed July 14, 1943
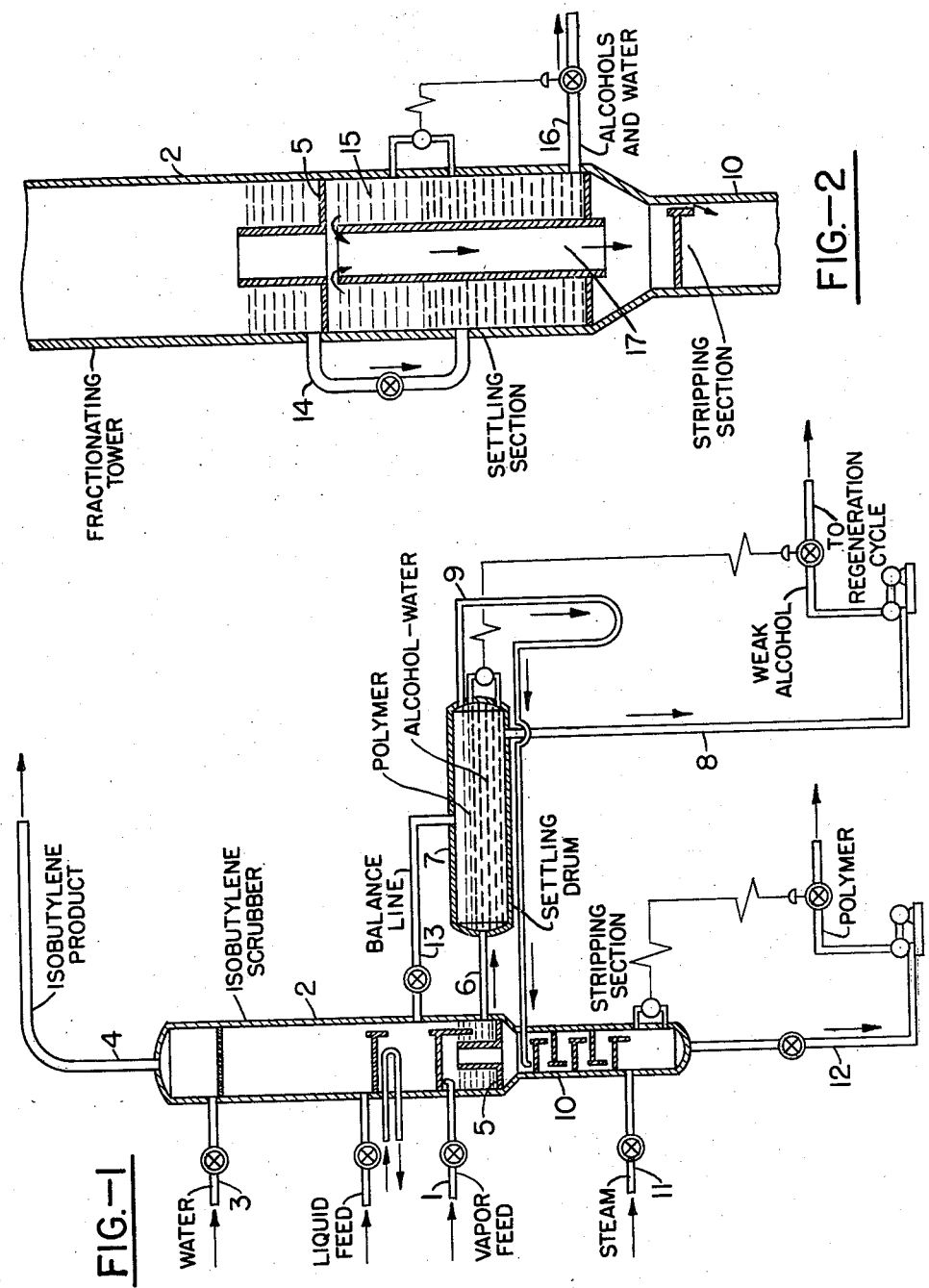
Walter H. Rupp
Richard O. Wright  INVENTORS
BY _____ ATTORNEY Patented Nov. 26, 1946

2,411,809

UNITED STATES PATENT OFFICE 2,411,809

APPARATUS FOR SEPARATING FLUIDS

Walter H. Rupp, Mountainside, and Richard O. Wright, Elizabeth, N. J., assignors to Standard Oil Development Company, a corporation of Delaware Original application July 14, 1943, Serial No. 494,654. Divided and this application March 23, 1944, Serial No. 527,728

5 Claims. (Cl. 202—153)

This invention relates to apparatus for separating one substance in vapor form from two immiscible liquid substances, and more particularly it relates to an apparatus for fractionating and stripping isobutylene out of the mixed product obtained when regenerating isobutylene from an acid solution thereof.

Isobutylene has many important uses as a raw material in the manufacture of important commercial products, such as in the manufacture of 2,2,4-trimethyl pentane by polymerizing isobutylene to di-isobutylene and then hydrogenating the latter, in the manufacture of synthetic rubber of the butyl rubber type by copolymerizing isobutylene with a small proportion of a diolefin such as butadiene or isoprene, as well as in the manufacture of many other chemical products. However, for these various uses, the isobutylene should in most cases be relatively pure for best results, and a suitable process for obtaining it in desired purity has been to contact mixed fluids (gaseous or liquid phase) containing isobutylene with a dilute sulfuric acid of, for instance, about 65% concentration at ordinary temperature and then to strip the resulting acid extract to liberate the isobutylene. In this manner the stream which is stripped from the extract consists of isobutylene, in admixture with minor amounts, e. g., about 2% to 6% of isobutylene polymers, such as di-isobutylene polymers with traces of tri-isobutylene or higher polymers, about 30% or 40% of alcohols, chiefly secondary and tertiary butyl alcohols, and water. One possible method for separating the isobutylene from these polymer and alcohol impurities is to fractionate the mixture in a tower used as a combination scrubbing and fractionating tower in which the vapors rich in isobutylene are fed in at the bottom of the tower and water is fed in at the top of the tower for scrubbing the alcohols (which are water-soluble) out from the rising vapors, with the result that substantially pure isobutylene gas, having a purity of about 90% or 95%, is removed from the top of the tower while the bottoms from the tower consist of a mixture of the scrubbing water, the alcohols, and the polymers which have accumulated during the fractionation process. These bottoms also contain a small but substantial amount of isobutylene in solution and heretofore, where any attempt has been made to recover this dissolved isobutylene, the entire bottoms stream has been subjected to stripping by a suitable material, such as steam, this being done either in a separate tower or in a separate stripping section added on to the lower part of the main scrubbing and fractionating tower.

It has now been found that any isobutylene dissolved in the alcohol portion of the fractionating tower bottoms can be substantially completely rejected from the alcohol phase by diluting the alcohol phase with water to about 2–12% alcohols. The polymer phase dissolves isobutylene, however and is inherently immiscible with water or the dilute aqueous solution of the alcohols, and therefore it is one object of the present invention to separate and remove the alcohol-water solution from the bottoms before stripping the latter with steam to recover dissolved isobutylene. Another object is to provide means especially adapted for effecting this separation and stripping isobutylene from the polymer in the most efficient manner.

One advantage of this invention is that it permits the stripping of the polymer bottoms separately from the much larger quantity of alcohol-water solution, and thereby effects the stripping with a much smaller quantity of steam than would be necessary to strip the entire fractionating tower bottoms. Another advantage which results from the one just mentioned is that if the stripping is effected in a section added on to the bottom of the fractionating tower, this stripping section may be constructed with a much smaller size than if the alcohol-water solution were also being stripped. A still further advantage is that the use of the smaller amount of steam for this stripping permits a relatively higher efficiency in the fractionation and scrubbing taking place in the fractionating tower.

The present invention comprises injection of the maximum volume of dilution water into the top of the scrubbing tower folowed by separating the dilute alcohol-polymer mixture into two separate liquid phases, one the upper lighter phase consisting essentially of oily polymer containing isobutylene gas dissolved therein, and the lower phase of dilute alcohol containing substantially no isobutylene or polymer. These phases may be separated by gravity either by settling or by centrifuging or by other suitable means, and this separation may be effected either in a settling drum entirely extraneous from the fractionating tower or may be carried out in a settling section added to the bottom of the fractionating tower. This separation is preferably carried out continuously and in conjunction with a continuously operated scrubbing and fractionating tower. The polymer layer only is sent to a stripping section for removal of isobutylene.

The alcohol-water solution separated in the settling drum may, if desired, be recycled to the extract stripping zone for dehydration to isobutylene, or may be subjected to further purification or processing steps to refine and concentrate the alcohols for sales uses as such.

Similarly after the dissolved isobutylene has been stripped from the polymer, the latter may likewise be subjected to purification or other processing steps, either for use as such or for conversion into other products of equal or higher molecular weight as by converting the di-isobutylene into 2,2,4-trimethyl pentane by hydrogenation, etc., or for regeneration into isobutylene by heat or catalytic cracking.

The objects, advantages, and further details of the invention will be better understood from the following description read in combination with the accompanying drawing, in which Fig. I represents a vertical section of a scrubbing and fractionating tower with a reduced steam stripping section beneath it and an extraneous settling drum, whereas Fig. II represents the lower portion of a fractionating tower and the upper portion of a lower steam stripping section with a settling section integrally interposed therebetween. In these several figures, like reference numerals indicate like parts.

Referring to Fig. I, a mixed vapor rich in isobutylene and containing alcohols and small amounts of polymer are fed from an isobutylene regenerating apparatus not shown, through line 1 into scrubbing and fractionating tower 2 near the bottom thereof, while water is fed through line 3 into the top of the tower 2 to scrub the rising vapors and thereby remove the alcohols therefrom which are water-soluble, and to dilute the alcohol so that a polymer layer will separate. The desired temperatures are maintained throughout the tower by suitable heating and/or cooling coils, not shown. It is preferable when scrubbing and fractionating isobutylene to remove polymers and alcohols therefrom, to maintain a temperature of about 100° to 150° F. in the bottom of the tower, about 100° to 130° F. in the middle portion and about 90° to 110° F. at the top of the tower. Substantially pure isobutylene is removed from the top of the tower through line 4 and the bottoms which collect in the bottom tray 5 are removed through line 6 into settling drum 7 from which the lower alcohol-water phase is withdrawn through line 8 and pumped to suitable isobutylene-regenerating apparatus not shown, while the upper liquid phase consisting essentially of oily polymer-containing isobutylene dissolved therein is removed from the settling drum 7 through line 9 and returned to the upper portion of the stripping section 10 constructed below and communicating with the fractionating tower 2. Steam is fed through line 11 into the lower portion of said stripping section 10 in order to strip the dissolved isobutylene from the descending polymer solution. The isobutylene stripped from said polymer solution rises out of the stripping section up through the bottom tray 5 of the fractionating tower 2 and mixes with the other vapors rising therethrough. Polymer liquid now substantially free from dissolved isobutylene is removed from the stripping section 10 through line 12. The desired temperature may be maintained in this stripping section 10 by suitable heating and/or cooling coils, not shown.

The equipment just described and illustrated in Fig. I is advantageously adapted to continuous operation, and even the removal of the two liquid phases from the settling drum 7 and removal of the polymer from the stripping section 10 may be made automatic as well as continuous by use of suitable liquid level indicator controls. A balance line 13 may be provided in order to maintain pressure balance between the overlying vapor space in the settling drum 7 and the vapor in fractionating tower 2. The entire equipment may be operated at any desired pressure, such as atmospheric pressure or super- or sub-atmospheric pressure. Also, if desired, the settling drum may be placed at a lower level, in which case it would, of course, be necessary to pump the polymer solution from line 9 into the stripping section 10. Another alternative previously suggested in a general way is the use of a centrifuge in place of, or in conjunction with, the settling drum 7, as, for instance, using the settling drum 7 for settling out the major proportion of the alcohol-water solution from the oily polymer phase and then passing the latter through a centrifuge to remove a minor residual proportion of alcohol-water phase.

Referring to Fig. II of the drawing, the bottoms which collect in the bottom tray 5 of the fractionating tower 2 are permitted to flow by gravity through line 14 into the middle portion of the settling section 15 constructed immediately beneath and communicating with the fractionating tower 2. In this settling section 15, the alcohol-water phase settles substantially free of polymer and isobutylene, and is removed continuously through line 16 while the polymer solution containing dissolved isobutylene rises to form a substantially clear upper liquid layer and overflows down through the hollow central portion 17 of the settling section 15 on to the top tray of the steam stripping section 10 constructed immediately beneath and communicating with the settling section 15. This embodiment of the invention provides added simplicity and efficiency in that it requires a minimum of apparatus and connecting parts and may be made completely automatic with the provision of a liquid level indicator control for regulating the flow of alcohol-water solution removed through line 16.

If desired, instead of using open stripping steam, one may use a reboiler, which, of course, would be located in the same position as the stripping section 10.

A conventional design of an isobutylene scrubber tower would require a stripping section about 6 times the cross sectional area and about 10 times the amount of stripping steam as for the system described above. This illustrates numerically the advantages of the invention in respect to the savings in steam consumption and in regard to the reduction in size of the stripping section required.

Although the invention has been described above as specifically applied to the recovery of isobutylene from the fractionating tower bottoms containing polymers, alcohols and water, in its broader aspect, the invention may be applied to any fractionating tower where the bottoms consist of two or more immisicble liquids, and where the dissolved vapor occurs primarily in solution in one of these liquids. Other examples of applications of this invention are as follows:

1. In solvent extraction, for stripping extract from the liquid solvent.

2. In manufacturing butadiene, for removing butenes and butadiene from polymer by-products.

3. In isopropyl alcohol manufacture, for removing isopropyl alcohol from polymer by-product.

This is a division of our copending application entitled "Separating fluids and apparatus therefor," Serial No. 494,654, filed July 14, 1943.

It is not intended that this invention be limited to the specific examples and embodiments which have been given merely for the sake of illustration.

We claim:

1. Apparatus for separating one substance in vapor form from two immiscible liquid substances, comprising an elongated tower containing a fractionating zone, an intermediate liquid-liquid separating zone, and a stripping zone for bottoms from said fractionating zone, means for feeding into said fractionating zone near the bottom thereof a mixture of fluids to be separated, means for removing vapor from the top of said fractionating zone, means for conducting liquid bottoms from the fractionating zone into the separation zone, means for removing two separate liquids from the separation zone, means for conducting one of the liquids from said separation zone into the stripping zone, means for removing vapor and vapor-free liquid bottoms from said stripping zone, said apparatus also having means for supplying thereto supplementary fluid immiscible in the liquid state, with one of said two immiscible liquid substances, and with condensate of the substance to be removed in vapor form.

2. Apparatus according to claim 1 having means for feeding the supplementary fluid in liquid form into the upper part of the fractionating zone.

3. Apparatus according to claim 1 having means for feeding the supplementary fluid in vapor form into the lower section of the stripping zone.

4. Apparatus according to claim 1 having means for feeding the supplementary fluid in liquid form into the upper part of the fractionating zone, and also having means for feeding the same supplementary fluid in vapor form into the lower section of the stripping zone.

5. Apparatus according to claim 1 in which the said stripping zone has a substantially lesser capacity than would normally be required for the stripping of the entire bottoms from the fractionating zone, but sufficient capacity for stripping one liquid separated from the mixed liquid fractionating bottoms, there being direct vertical vapor connection between the bottom, middle, and upper sections of said tower, there being also means for conducting the mixed liquid bottoms from the upper or fractionating section of the tower directly into the middle portion of the middle or separating section of the tower and means for permitting liquid to overflow from the upper portion of the separating zone directly and within the interior of the tower into the upper portion of the bottom or stripping section of the tower.

WALTER H. RUPP.
RICHARD O. WRIGHT.